United States Patent [19]
Bachmann

[11] 3,850,058
[45] Nov. 26, 1974

[54] PIPE CUTTING EQUIPMENT

[76] Inventor: George Bachmann, 945 Metro Dr., Monterey Park, Calif. 91754

[22] Filed: May 11, 1973

[21] Appl. No.: 360,403

[52] U.S. Cl. .................................. 82/101, 82/4 C
[51] Int. Cl. ........................... B23b 3/04, B23b 3/22
[58] Field of Search ................ 82/4 C, 101, 102, 78

[56] References Cited
UNITED STATES PATENTS

| | | | |
|---|---|---|---|
| 2,753,739 | 7/1956 | Dreier | 82/4 C X |
| 3,247,743 | 4/1966 | Frost et al. | 82/4 C |
| 3,691,881 | 9/1972 | Bachmann | 82/4 C |
| 3,699,828 | 10/1972 | Platek | 82/4 C |

*Primary Examiner*—Harrison L. Hinson
*Attorney, Agent, or Firm*—William W. Haefliger

[57] ABSTRACT

Apparatus for cutting pipe comprises a. drive means engageable with one of said inner and outer surfaces for relatively rotating the apparatus and pipe, b. thrust exerting means engageable with the other of said inner and outer surfaces for locating the pipe with presentation toward the drive means, said thrust exerting means including first and second support slides and rollers carried thereby and spaced apart about the pipe axis, there being guides for the slides to guide linear movement thereof toward and away from the pipe axis to accommodate roller engagement with pipe of different diameters, c. cutting structure engageable with the pipe to cut a groove in the pipe and extending about the pipe axis in response to said pipe rotation relative to said apparatus, and d. body structure carrying said drive means, guides and cutting structure.

12 Claims, 8 Drawing Figures

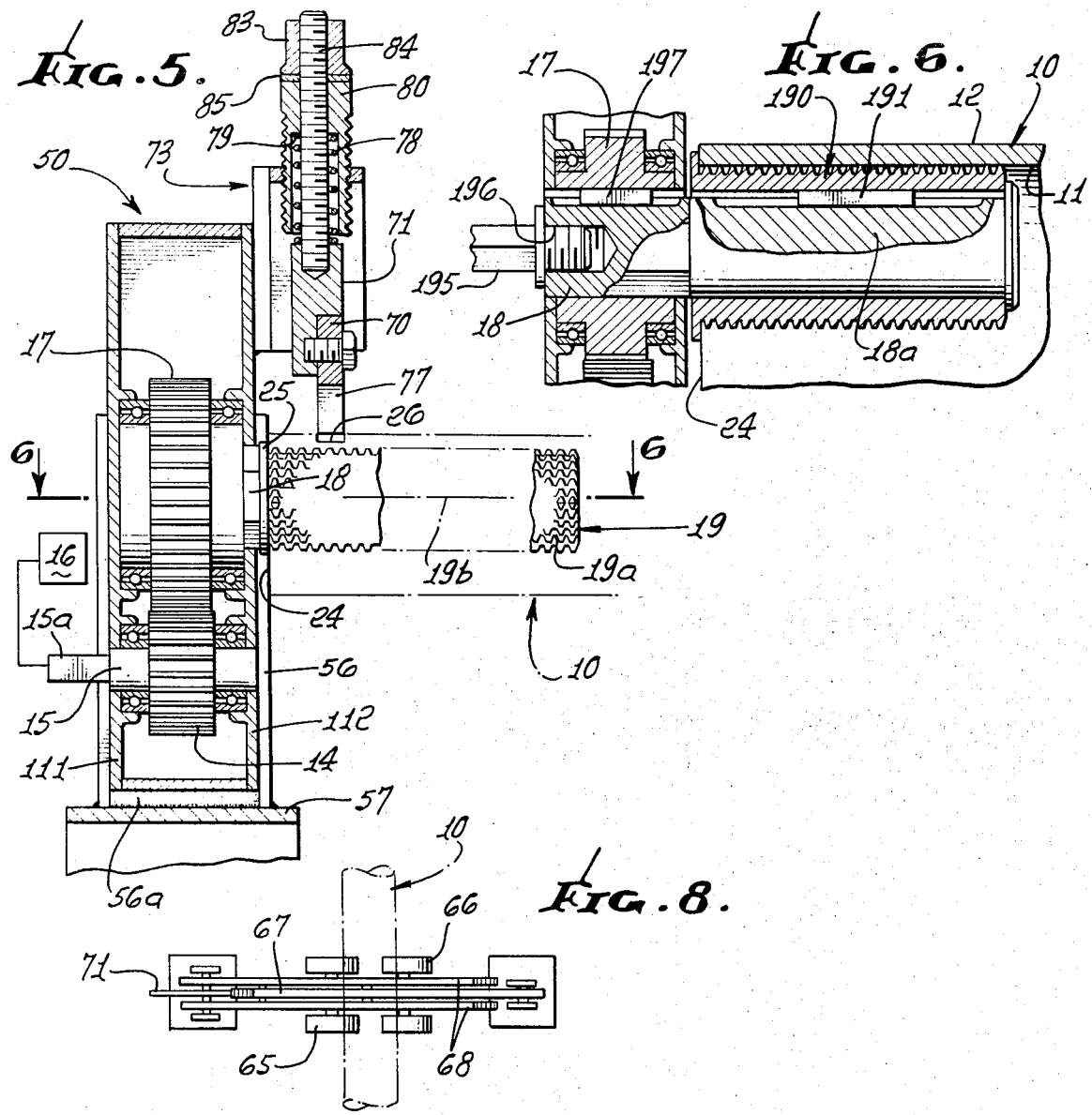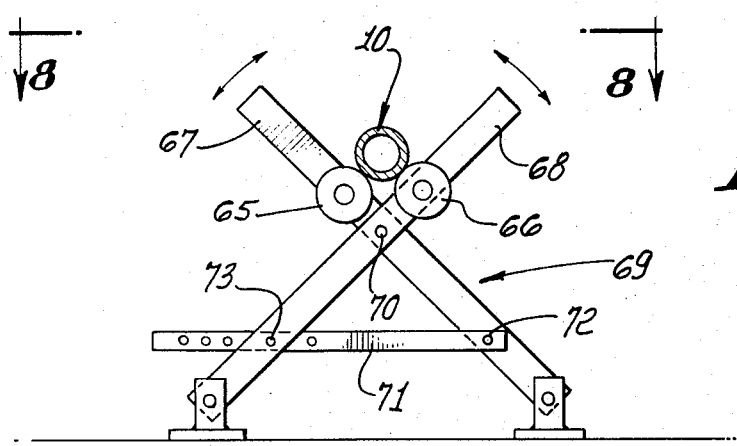

3,850,058

PIPE CUTTING EQUIPMENT

BACKGROUND OF THE INVENTION

This invention relates generally to apparatus for cutting pipe, and the like, and more particularly concerns improvements in the construction and operation of pipe grooving and cut-off apparatus.

There is a continuing need for easily operable and highly reliable equipment for grooving and/or cutting-off metallic pipe of a wide range of diameters, and which can be used on the jobsite and also at locations to which heavy pipe can be brought. While attempts have been made in the past to meet this need, no apparatus of which I am aware embodies the unusually advantageous features of construction, modes of operation and beneficial results afforded by the present invention, as will be seen. Among these are the capacity for accepting pipe of substantially different diameters, for both grooving and cut-off; portability; spring loading and simultaneous adjustability of the cutter or cutters; integration of all feed and tension controls at one location; improved adjustable mounting of the tool on the pipe for rotation about the pipe during grooving; alternate capability to rotate the pipe while the tool remains fixed; cutting rate control; capacity for location of the grooving tool at an adjustable distance from the end of the pipe; and additional advantages will be seen.

SUMMARY OF THE INVENTION

It is a major object of the invention to provide pipe cutting apparatus embodying the above advantageous features, modes of operation and results. Basically, the apparatus comprises, in combination, drive means engageable with one of the inner and outer surfaces of the pipe for rotating the pipe or, alternatively, for driving the tool about the pipe; thrust exerting means engageable with the pipe for locating it with presentation to the drive means, the thrust exerting means including first and second supports, as for example slides, and two rollers carried by the slides and spaced about the pipe axis, the slides being adjustable to move toward and away from the pipe axis with great precision in order to accurately control depth of groove cutting, as will be seen; and cutting structure carried by body structure which also supports the drive means and thrust exerting means.

It is another object of the invention to provide a base releasably mounting the body structure for tilting in accordance with tilting of the pipe axis during groove cutting, as for example when the pipe is rotated by the fixed position tool, so as to prevent binding and irregular cutting. For this purpose, the body and base may, with unusual advantage, have downwardly tapering interfit enabling ready installation and removal of the body on and from the base; resilient pad means may support the body on the base; resilient spring means may support the base itself; and an adjustable height scissors linkage may support the pipe to align it coaxially with the pipe drive means on the tool, minimizing problems of binding and irregular cutting.

These and other objects and advantages of the invention, as well as the details of an illustrative embodiment, will be more fully understood from the following description and drawings, in which:

DRAWING DESCRIPTION

FIG. 5 is a section taken in elevation lines 5—5 of FIG. 2;

FIG. 6 is a horizontal section taken on lines 6—6 of FIG. 5;

FIG. 7 is an enlarged frontal elevation taken on lines 7—7 of FIG. 1; and

FIG. 8 is a plan view taken on lines 8—8 of FIG. 7.

DETAILED DESCRIPTION

Figure 1:
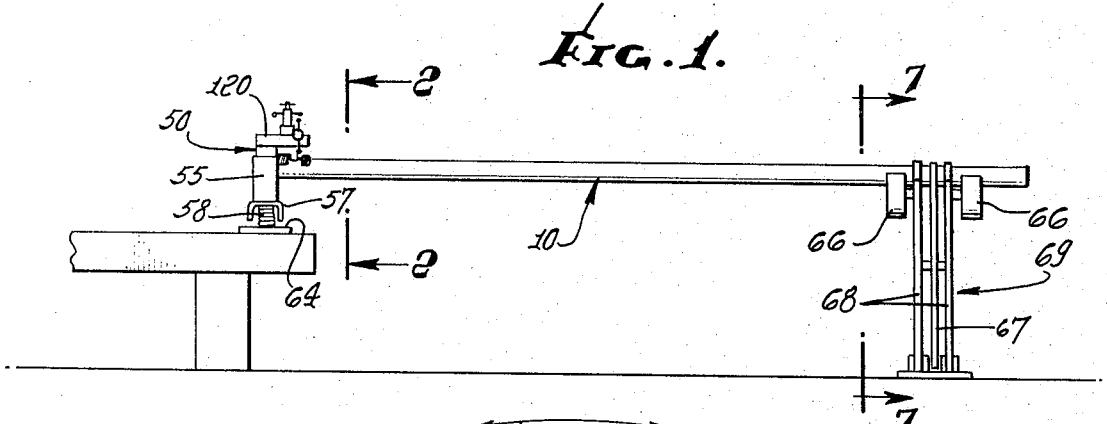
FIG. 1 is a side elevation.

In the drawings, apparatus is shown for cutting or grooving pipe 10 having inner and outer surfaces 11 and 12, and an axis 13. Drive means is engageable with one of such surfaces, as for example inner surface 11, for relatively rotating the apparatus and pipe. Such drive means may typically include a special spur gear 14 with a removable drive shaft 15 projecting at 15a for driven connection with a rotary power source 16; a larger and special spur gear 17 (for speed reduction) meshing with gear 14 and driving a shaft 18, and pipe engaging drive roller 19 carried and driven by shaft extension 18a. Shaft 18 may have interfit with gear 17 so as to be easily releasable and replaceable. Roller 19 may be suitably retained on the shaft, as for example is described in my U.S. Patent application Ser. No. 128,953, filed Mar. 29, 1971, now U.S. Pat. No. 3,691,881.

Roller 19 may typically be serrated or toothed at 19a to positively grip and drive pipe surface 11. When the pipe is rotated about the tool by roller 19 (assuming the tool does not rotate) for example in the direction of arrow 23 in FIG. 2, a stop flange 25 carried by the roller 19, or shaft 18, is urged relatively against the pipe end 24. This enables accurate spacing from that pipe end of the groove 26 cut in the pipe wall by the tool cutter 77. Accordingly, grooves may rapidly be cut in the ends of heavy pipes in the field, with or without mounting them for rotation, the pipe ends then being capable of joinder as by a coupling interfitting and bridging the grooves as explained in my prior application. Pipe ends may also be cut-off.

Figure 4:
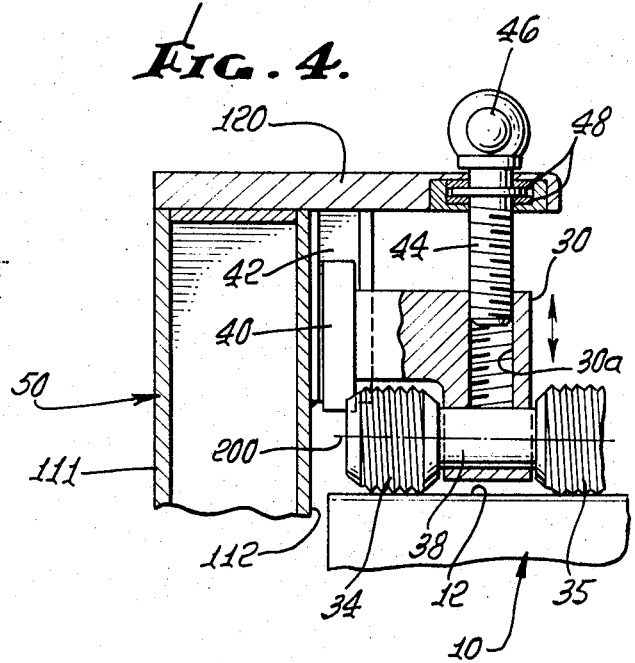
FIG. 4 is a section taken on lines 4—4 of FIG. 2.

Also provided is what may be referred to as thrust exerting means engageable with the other of the inner and outer pipe surfaces (as for example outer surface 12), for locating the pipe with close presentation to the drive roller. The illustrated thrust exerting means includes first and second supports, as for example slides 30 and 31 movable along axes 32 and 33 respectively, such axes being spaced about pipe axis 13 and roller axis 19b as well as extending generally toward the latter axis. Further, the thrust exerting means includes two coaxial thrust rollers carried by each slide and spaced about the axis 13 and 19b. As illustrated, the coaxial rollers 34 and 35 are carried by slide 30, and similar, coaxial rollers 36 (not shown) and 37 are carried by slide 31, there being suitable axles 38 carried by the slides and mounting the rollers to freely rotate. As will be seen from FIGS. 2 and 4, the slides are capable of adjustable movement toward and away from axis 19b to accommodate roller engagement with, and support of, pipe of widely varying diameters, to enable grooving thereof. Rollers 35 through 37 are helically grooved as shown, and tilted, to urge the pipe relatively toward flange 25, i.e., the axis 200 of rollers 34 and 35 extends at an angle of about ½° down from horizontal and about ½° inwardly toward a vertical plane through horizontal axis 19b, and the axis 201 of rollers 36 and 37 extends at an angle of about ½° down from horizontal.

The thrust exerting means may also be characterized as including the dovetail guides 40 and 41 supporting the slides for guided movement along axes 32 and 33, the guides and slides having dovetail interfit at 42 and 43. Adjustment screws 44 and 45 have left-handed thread interfit with threaded bores 30a and 31a in the slides, so that turning of handles 46 and 47, attached to the screws, advances and retracts the slides and rollers along axes 32 and 33, respectively. Note that bearings 48 and 49 mount the fasteners for rotation and retain them, axially. The bearings are carried by structure arms 120 and 121. This also contributes to accommodation of the grooving equipment to pipe of widely different sizes or diameters.

Support structure is also provided to carry the drive means and thrust exerting means as described, as well as the cutting structure to be described. Such structure may advantageously include a flat plate shaped body 50 supporting the frontwardly projecting arms 120 and 121, and having front and back cover plates 111 and 112 associated with drive gearing 14 and 17 as referred to.

In accordance with an important aspect of the invention, a base releasably mounts the plate-shaped body 50 for tilting in accordance with tilting of the pipe axis during relative rotation of pipe and cutting apparatus. In this regard, the base may include a V-shaped channel arms 55 and 56 carried by a horizontal frame part 57, the latter spring mounted as at 58 to tilt in all directions whereby the arms 55 and 56 may tilt in all directions away from a vertical as indicated by arrows 59 in FIG. 2, and arrows 60 in FIG. 3. Channel shaped part 57 is urged upwardly by springs 58 against stops 62 on rods 63 anchored to mounting pads 64. Rubber pads 55a and 56a in channel arms 55 and 56 lend additional flexibility to the body 50, which seats on such pads in a wedging manner. Accordingly, binding and irregular cutting tendencies are minimized where the pipe is rotated by the tool.

FIGS. 1, 7 and 8 show adjustable supporting of the pipe 10 by roller 19 and also by rolls 65 and 66 respectively carried by the legs 67 and 68 of a scissors linkage 69, thereby to minimize problems of pipe tilting at the tool, as referred to. The legs are pivotally interconnected at 70 and may be relatively swung to elevate or lower the rolls 65 and 66, as by adjustment of member 71. The latter is connected at 72 to leg 67, and at 73 to leg 68, various holes in the member 71 facilitating shortening or lengthening of the member connection between legs 67 and 68.

FIG. 6 shows the provision of a substantially larger diameter serrated drive roller 190 attached to the drive shaft extension 18a, as via a key 191. The latter roller 190 is sized to drive pipe of larger internal diameter. Direct drive is transmitted to shaft 18 via input drive member 195 inserted into threaded recess 196 in the shaft, for more rapid turning of the pipe. Gear 17 has keyed coupling to shaft 18 at 197. Shaft 15 and gear 14 may be removed under these conditions.

Figure 2:
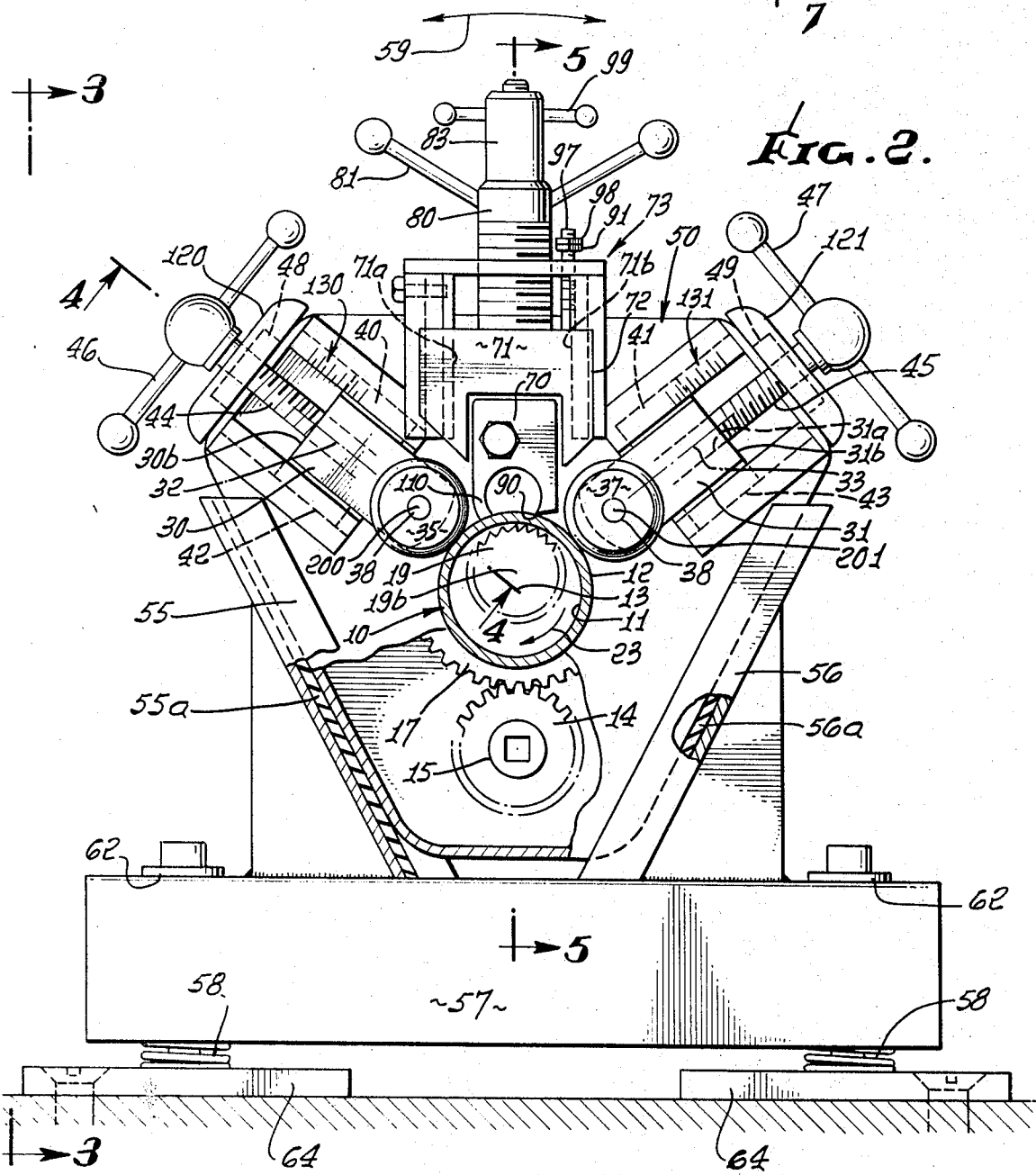
FIG. 2 is an enlarged frontal elevation taken on lines 2—2 of FIG. 1.
Figure 3:
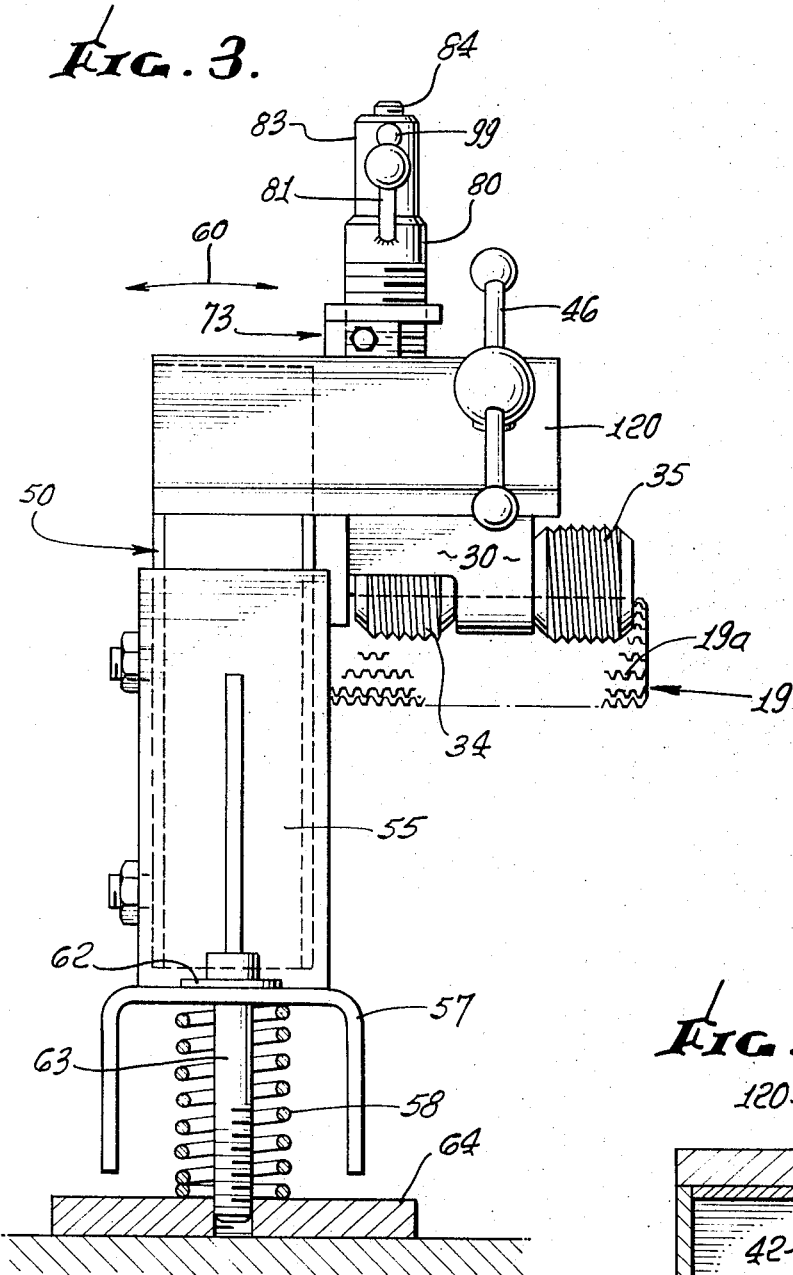
FIG. 3 is a side elevation taken on lines 3—3 of FIG. 2.

Referring to FIGS. 2, 3 and 5, a cutting tool head or post 70 is guided for movement toward and away from the pipe 10, as by the dove-tail corners 71a and 71b on a slide 71, which has slide interfit at 72 with support 73. The latter is attached to the body 50.

Means is provided to yieldably urge the slide and post, as well as cutting tool 77 carried by the post, toward the pipe. Such means is shown to include a compression spring 78 the lower end of which engages and urges the slide 71 downwardly, and the opposite or upper end of which engages a shoulder 79 on a first carrier 80 in the form of a sleeve. The latter has threaded engagement at 84 with rotor 83 so as to support the upper end of the spring for movement toward and away from the pipe, thereby to vary the spring compression and downward force exertion on the slide. As will be seen, the spring generates the force yieldably urging the cutter against the pipe, and this force may be varied by rotating the first carrier 80. For this purpose, the carrier may be provided with a handle 81, as seen in FIG. 1.

A second carrier, as for example, may comprise rotor 83, is operatively connected with the post 70 and carried by the first carrier sleeve 80 for adjustable movement displacing the post toward and away from the pipe while spring 78 continues to urge the head and cutter 77 toward the pipe. Carrier rotor 83 is shown as a sleeve having internal threaded connection with the upper portion of the feed screw 84, the lower end of which is attached to slide 71. When rotor sleeve 83 is turned, as by means of handle 99 to retract the screw and also the slide 71, post 70 and cutter 77 away from the pipe, the spring force exerted on the slide is transmitted via the screw to the rotor 83 and urges it into engagement with a thrust bearing 85 on the carrier 80; conversely, when the rotor 83 is turned in the opposite rotary direction to advance the screw 84 and therefore the cutter 77 toward and into engagement with the pipe, the spring force is transferred to the cutter. Such transfer can be determined by observing the disengagement of rotor 83 from the thrust bearing. Accordingly, accurate control of cutting force application generated by a heavy-duty spring is realized, for rapid and accurate pipe cutting.

A guide 110 may also be carried by post 70 to guide in the groove and thereby assure orientation to the post to present the tool 77 squarely to the groove.

In operation, a pipe is mounted on the apparatus as shown in FIGS. 1 and 2, and the bearing rollers 34–37 are individually adjusted to clamp the pipe inner wall 11 against the drive roller or cylinder 19. At this time, the post 70 may be in retracted position. Next, the carrier 83 is rotated to advance the cutter downwardly into engagement with the pipe, and the carrier is further turned to back away from thrust bearing 85. In this regard, the extent of such back-off may be used to control the depth of grooving, the carrier 83 re-engaging the thrust bearing to limit further cutting when the desired depth is achieved. Normally, however, an adjusting nut 91 on a threaded stud 97 carried by slide 71 is used to limit depth of cut by engagement with the top of support 73. For this purpose, stud 97 may project through an opening in that support. Locking nut 98 locks adjusting nut 91 is selected position. Next, the drive roller 19 is rotated to effect pipe relative rotation and cutting.

It should also be noted that provision for individual adjustability of advancement of the slides 30 and 31 relative to the pipe serves as a means to control the angle of attack of the operative or selected cutter relative to the pipe, for cutting rate control. Thus, in FIG. 2, if rollers 36 and 37 are advanced toward the pipe and rollers 34 and 35 retracted, the cutting edge 90 of tool 77 will have a larger angle of attack relative to the pipe outer surface. Edges 30b and 31b on the slides variably register with indicia on vernier scales 130 and 131 on the respective fixed guides 42 and 43, for enabling high precision control of cutting depth.

The spring 78 tends to prevent jamming due to the fact that the cutter and post 70 are able to move outwardly relative to the pipe and against spring compression should cutting resistance approach drive force transmitted to the pipe by the drive roller 19. Rollers 34–37 may then be adjusted to decrease the cutter angle of attack, to relieve the jamming tendency.

I claim:

1. In apparatus for cutting pipe having inner and outer surfaces and an axis, the combination comprising a. drive means engageable with one of said inner and outer surfaces for rotating the pipe relative to said apparatus,
   b. thrust exerting means engageable with the other of said inner and outer surfaces for locating the pipe with presentation toward the drive means, said thrust exerting means including first and second supports and two rollers carried thereby and spaced apart about the pipe axis, the supports being carried for adjustable movement toward and away from said axis to accommodate roller engagement with pipe of different diameters,
   c. cutting structure engageable with the pipe to cut a groove in the pipe and extending about the pipe axis in response to pipe rotation relative to said apparatus,
   d. body structure carrying said drive means, thrust exerting means and cutting structure, and
   e. a base releasably mounting said body structure for tilting in accordance with tilting of the pipe axis during said relative rotation.

2. The combination of claim 1 wherein the body and base have downwardly tapering interfit.

3. The combination of claim 2 including resilient pad means between the base and body to transmit loading from the body to the base and to resiliently accommodate said tilting.

4. The combination of claim 2 including resilient spring means supporting the base to accommodate tilting of the base.

5. The combination of claim 2 including a scissors type linkage for supporting the pipe at a location spaced from the body, the linkage being adjustable for raising and lowering the locus of pipe support thereon.

6. The combination of claim 1 wherein said supports comprise slides, and including guides on the body and interfitting the slides to guide linear movement of the slides toward and away from the pipe axis.

7. The combination of claim 6 including adjustable screw means carried by the body and operatively connected to the slides to move then linearly as aforesaid.

8. The combination of claim 6 including a scale on one of the guide and slide of each pair and graduated in the direction of said linear movement, and a marker on the other of the slide and guide of each pair to variably register with the scale in response to said relative linear movement of the slide and guide.

9. In apparatus for cutting pipe having inner and outer surfaces and an axis, the combination comprising a. drive means engageable with one of said inner and outer surfaces for relatively rotating the apparatus and pipe, said drive means defining a drive axis,
   b. thrust exerting means engageable with the other of said inner and outer surfaces for locating the pipe with presentation toward the drive means, said thrust exerting means including first and second support slides and rollers carried thereby and spaced apart about the pipe axis, there being linear guides for the slides to guide linear movement thereof toward and away from the pipe axis to accommodate roller engagement with pipe of different diameters, the guides and slides having tongue and groove interfit,
   c. cutting structure engageable with the pipe to cut a groove in the pipe and extending about the pipe axis in response to said pipe rotation relative to said apparatus,
   d. body structure carrying said drive means, guides and cutting structure, said guides being immovable relative to the body structure and
   e. a first pair of said rollers being coaxially carried by a first axle supported by the first slide at a location intermediate the first rollers, and a second pair of said rollers being coaxially carried by a second axle supported by the second slide at a location intermediate the second rollers, the first pair of rollers freely rotatable about a first axis and the second pair of rollers freely rotatable about a second axis, said first and second axes being generally parallel to the drive axis and defining a plane which is at one side of the drive axis.

10. The combination of claim 9 including adjustable screw means carried by the body and operatively connected with the slides to move them linearly, as described.

11. The combination of claim 9 including a vernier scale on one of the guide and slide of each pair and graduated in the direction of said linear movement, and a marker on the other of the slide and guide of each pair to variably register with the scale in response to said relative linear movement.

12. The combination of claim 9 wherein the rollers carried by each slide are peripherally grooved to relatively urge the pipe endwise toward the body, and the axis of at least one pair of said rollers carried by a slide tapers generally toward the drive axis defined by said drive means and in direction away from the body structure.

* * * * *